July 3, 1928.
O. L. DOWNING
ADJUSTABLE HOSE CAP FOR FIRE DEPARTMENT CONNECTIONS
Filed May 9, 1927      2 Sheets-Sheet 2
1,676,081
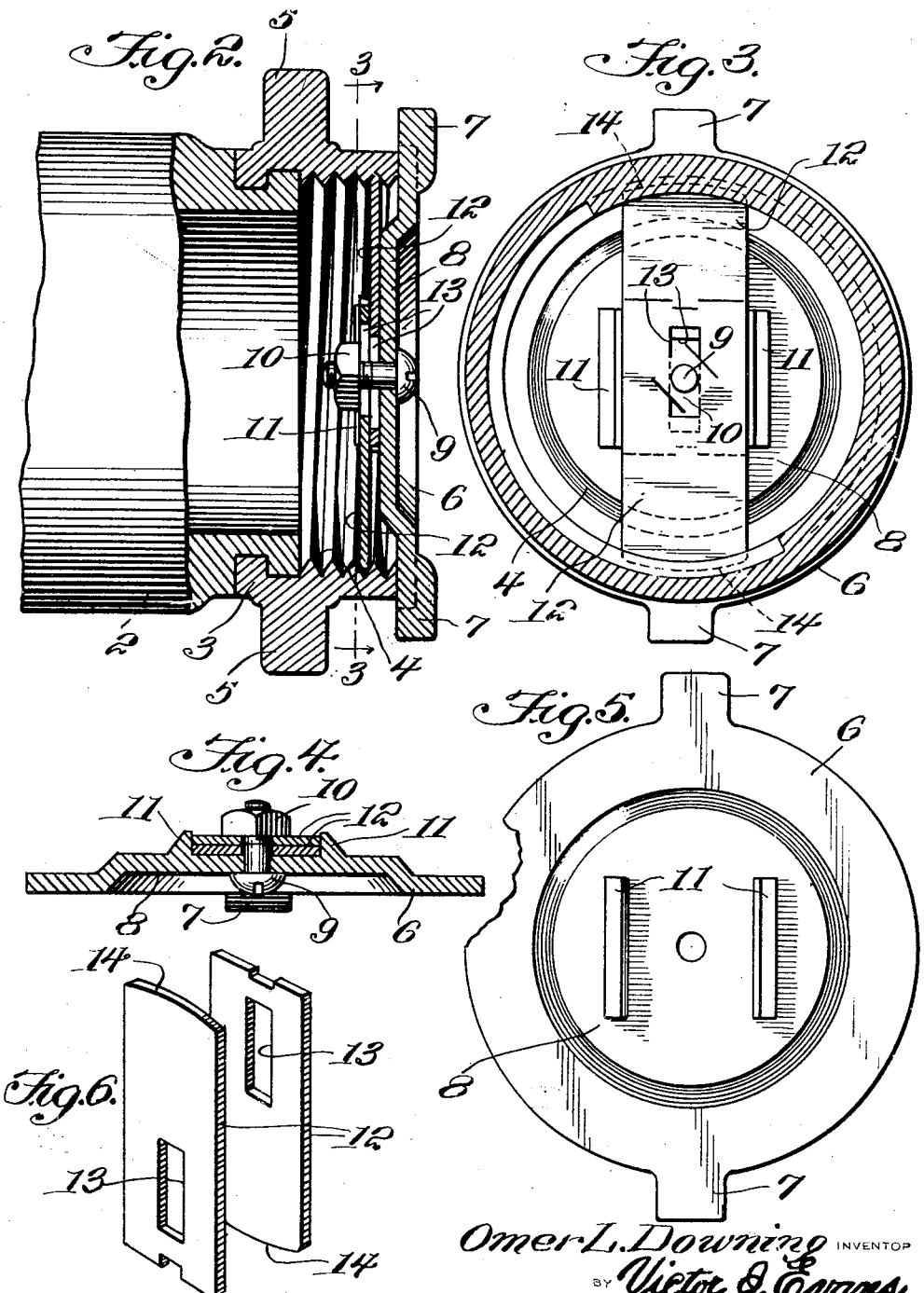

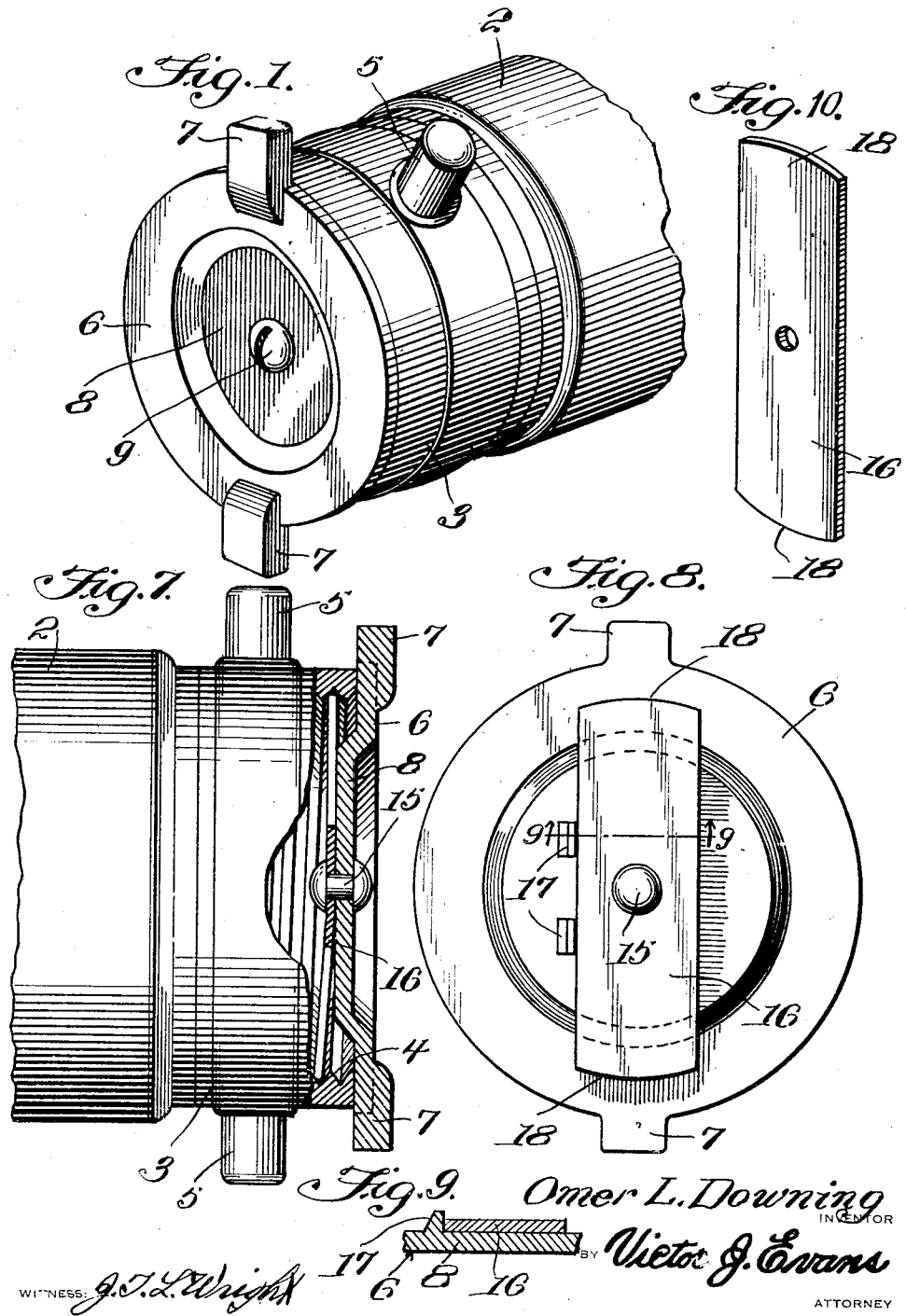

Patented July 3, 1928.

1,676,081

UNITED STATES PATENT OFFICE.

OMER L. DOWNING, OF SOUTH NORWOOD, OHIO.

ADJUSTABLE HOSE CAP FOR FIRE-DEPARTMENT CONNECTIONS.

Application filed May 9, 1927. Serial No. 190,063.

My present invention has reference to an improvement in caps for fittings such as steamer connections and other hose connections which are designed for temporary attachment to a fire engine hose for the purpose of supplying water to stand pipes, automatic sprinkler systems and the like.

Detachable caps are provided for such a frame to close the inlet thereof when not in use, in order to prevent the introduction of obstacles which are liable to obstruct the flow of water, and one of the important objects of my present invention is the provision of a cap for this purpose in the nature of a plate or disc having on its inner face a fixed galvanized steel bar whose ends are designed to travel between the threads of the hose connection when the cap is turned on such connection and whereby to produce a simple and inexpensive cap for this purpose which will be effectively held positioned and readily removed without the necessity of flanging and threading the cap.

A still further object is the provision of a cap for this purpose having bars or plates to coengage with the threads of a hose connection, and which bars or plates are adjustably associated with the cap so that the cap may be employed upon different sizes of hose connections.

The invention will be best understood from a consideration of the following detailed description when taken in connection with the accompanying drawings forming part of this specification, with the understanding, however, that the invention is not confined in any strict conformity with the showing of the drawings but may be changed and modified as long as such changes and modification mark no material departure from the salient features of the invention as expressed in the appended claims.

In the drawings:

Figure 1 is a perspective view illustrating the application of the improvement.

Figure 2 is an approximately central vertical sectional view therethrough.

Figure 3 is a sectional view approximately on the line 3—3 of Figure 2, looking in the direction of the arrows.

Figure 4 is a central transverse sectional view through the cap.

Fig 5 is an inner face view of the cap.

Figure 6 is a perspective view of the thread engaging plates employed.

Figure 7 is a side elevation with the cap in section showing the latter provided with a single thread engaging plate or bar.

Figure 8 is an inner face view of the cap illustrated in Figure 7.

Figure 9 is a detail sectional view approximately on the line 9—9 of Figure 8.

Figure 10 is a perspective view of the thread engaging plate or bar.

The steamer connection 2, illustrated in the drawings is of familiar construction, being attached to or if desired formed on one end of a pipe. The outer end of the connection 2 has swiveled thereon the usual ring 3 having internal threads 4 and provided with oppositely directed pins or lugs 5 to be engaged by a spanner for rotating the ring. The inlet is closed by a cap 6. The cap 6 is in the nature of a metal disc, having oppositely directed lugs 7 for the reception of a spanner for turning the cap. The cap is centrally bulged inwardly, as at 8, providing an inner flat face and an outer depression surrounding such face.

Passing centrally through the cap 6 there is a bolt 9, and this bolt has threaded thereon a nut 10.

The inner face of the cap, at points equidistant from the bolt opening therethrough, is formed with ribs 11. Between these ribs, in the preferred embodiment of the improvement there are arranged a pair of flat plates or bars 12, respectively. These bars have elongated openings 13 therethrough. The openings are disposed adjacent to the inner ends of the bars or plates and through these openings the bolt 9 passes, the nut when screwed on the bolt contacting with the outer bar or plate 12, it being understood and clearly illustrated by the drawings that the inner portions of the plates are in lapping relation. The outer edges of the plates are rounded, as at 14. By arranging the plates as above described, it will be apparent that the same may be adjusted longitudinally so that the rounded edges thereof may be brought toward or away from the periphery of the disc that constitutes the cap with the result that the said rounded ends of the plates may be disposed to travel between the threads 4 of ring members 3 of different diameters or sizes.

In Figures 7 to 10 the clip is of a similar construction to that previously described. In this instance there is passed centrally through the cap the shank of a double headed rivet 15, the said rivet also passing through a central opening in a plate 16. The inner face of the cap is formed with a pair of spaced lugs or ribs 17 that contact with one of the edges of the plate 16. The outer ends of the plate 16 are rounded, as at 18, and these ends are designed to travel between the threads of the ring member of the steamer connection. My improvement is of an extremely simple nature and may be cheaply manufactured and easily applied to or removed from a hose connection. The plates or bars 12 and 16 are preferably of galvanized steel and embody an inherent resiliency. Thus the plates or bars when engaged between the threads of the hose connections will slightly yield to firmly press the cap against such connections and effectively seal the same. By employing a pair of plates 12 the cap may be successfully attached to different sizes of hose connections.

Having described the invention, I claim:—

1. A detachable cap for hose connections, comprising a disc, plates adjustably fixed on the inner face of the disc and held from lateral movement thereon, said plates having their outer ends rounded and designed for travel between the threads of a hose connection when the cap is turned on the connection.

2. A detachable cap for hose connections, comprising a disc having its outer face centrally bulged inwardly, an adjustable pivot member passing centrally through the disc, ribs on the inner face of the disc at the opposite sides of the pivot, lapping plates having slots through which the pivot passes, arranged between the ribs and said plates having outer rounded ends designed for travel between the threads of a hose connection when the cap is turned on such connection.

In testimony whereof I affix my signature.

OMER L. DOWNING.